United States Patent [19]

Erdmann et al.

[11] Patent Number: 4,860,614

[45] Date of Patent: Aug. 29, 1989

[54] TRANSMISSION DIFFERENTIAL

[75] Inventors: Alan J. Erdmann; Ralph E. Shirley, both of Waterloo, Iowa

[73] Assignee: Deere & Company, Moline, Ill.

[21] Appl. No.: 226,336

[22] Filed: Jul. 26, 1988

[51] Int. Cl.[4] ............................................... F16H 1/40
[52] U.S. Cl. ......................................... 74/710; 74/713
[58] Field of Search .................................. 74/710, 713

[56] References Cited

U.S. PATENT DOCUMENTS

| | | | |
|---|---|---|---|
| 696,704 | 4/1902 | Allen | 74/713 |
| 1,503,763 | 8/1924 | Mosely | 74/713 |
| 2,408,926 | 10/1946 | Griffith | 74/713 |
| 2,563,680 | 8/1951 | Hoffman | 74/713 X |
| 3,825,099 | 7/1974 | Hopf | 184/6.12 |
| 3,955,443 | 5/1976 | Estrada | 74/710 X |
| 4,182,201 | 1/1980 | Mayhew et al. | 74/713 |
| 4,467,672 | 8/1984 | Lamy | 74/710 X |
| 4,543,854 | 10/1985 | Roth | 74/710 X |

FOREIGN PATENT DOCUMENTS

| | | | |
|---|---|---|---|
| 504461 | 8/1930 | Fed. Rep. of Germany | 74/710 |
| 1091379 | 11/1967 | United Kingdom | 74/710 |
| 1433707 | 4/1976 | United Kingdom | 74/710 |

Primary Examiner—Dwight G. Diehl

[57] ABSTRACT

A transmission differential includes a pair of output shafts mounted in a casing and non-rotatably received by a pair of bevel sun gears. A plurality of planet pinion shafts are received in apertures in the casing and rotatably support bevel planet gears. The inner end of each pinion shaft has a recess or groove therein. A central disc is positioned between the output shafts and engages the inner end of the pinion shafts to prevent radially inward movement thereof. The disc is received by the recesses to prevent rotation of the pinion shafts. Alternatively, a projection on the inner end of the pinion shafts can be received in a groove on an outer surface of the disc.

7 Claims, 3 Drawing Sheets

TRANSMISSION DIFFERENTIAL

BACKGROUND OF THE INVENTION

This invention relates to a transmission differential with a plurality of planet pins mounted through apertures in a case.

In transmission differentials, various methods or arrangements have been utilized to locate the planet pinions and to prevent their rotation. One method is to use four pinions and a split housing with shafts with shafts which fit together in a "Lincoln Log" fashion. This method is limited because it requires that the differential have two shafts and that the housing be split for assembly. Another method is to cross drill the pinions and to retain them in the case or housing with pins or screws. This method requires drilling of the pinions and of the housing. Another method is to use a central hub to which hollow tapered pinion shafts are attached with bolts. Another method is to use a cantilevered pinion shaft which is retained at its inner end by a snap ring and at its outer end by a pin or a screw.

A simpler and less costly design is desired which retains and prevents rotation of the pinion shafts.

SUMMARY OF THE INVENTION

An object of the present invention is to provide a pinion shaft retention and rotation prevention mechanism which is simple, inexpensive and easy to assemble.

These and other objects are achieved by the present invention wherein a plurality of pinion shafts extend radially through apertures in a transmission differential case. The inner end of each pinion shaft has a recess therein. A disc shaped central member is located between a pair of output shafts. The outer periphery of the disc is received by the recesses in the pinion shafts. The disc engages the bottom of the recesses to limit radially inward movement of the pinion shafts and engages the side walls of the recess to prevent rotation of the pinion shaft. Snap rings prevent radially outward movement of the pinion shafts.

DETAILED DESCRIPTION

Figure 1:
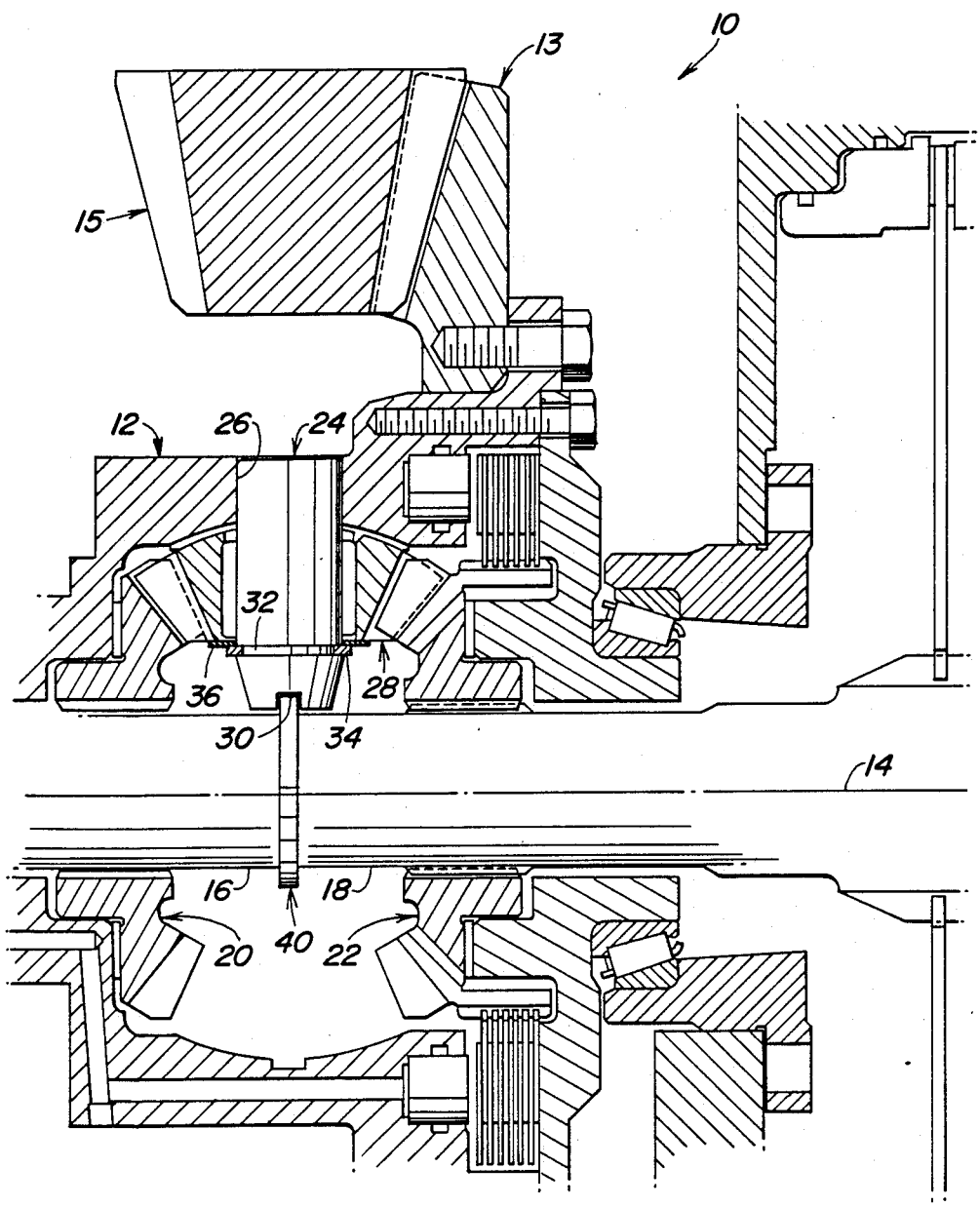
FIG. 1 is a partial sectional view showing the interior of a transmission differential according to one embodiment of the present invention.

Referring to FIG. 1, the transmission differential 10 includes a housing 12 which is rotatable about a main axis 14. A pair of axle or output shafts 16 and 18 are rotatable about the main axis and are received in the housing 12. Bevel output or sun gears 20 and 22 are non-rotatably mounted on shafts 16 and 18, respectively. The housing 12 non-rotatably supports a ring gear 13 which is driven by a drive shaft (not shown) through a bevel drive gear 15. The bevel gear drive could be replaced by a spur or worm gear, chain or belt drive.

A plurality (preferably three, with one being visible in FIG. 1) of pinion shafts 24 extend perpendicular to the main axis and have outer ends received in bores 26 in the housing 12. A bevel planet or pinion gear 28 is rotatably mounted on each pinion shaft 24. A groove 30 extends through the inner end of each pinion shaft 24. An annular groove 32 extends around the periphery of each pinion shaft 24. The groove 32 receives a snap ring 34. An annular ring 36 is mounted on the pinion shaft 24 and engages the snap ring 34 and the pinion gear 28 to limit radially outward movement of the pinion shaft 24.

A cylindrical disc 40 is held between the output shafts 16 and 18 and has a radially outer portion which is received by the grooves 30 to thereby prevent the pinion shafts 24 from rotating about their axis. The disc 40 is engageable with the bottom surface of grooves 30 to limit radially inward movement of the pinion shafts 24.

Figure 2:
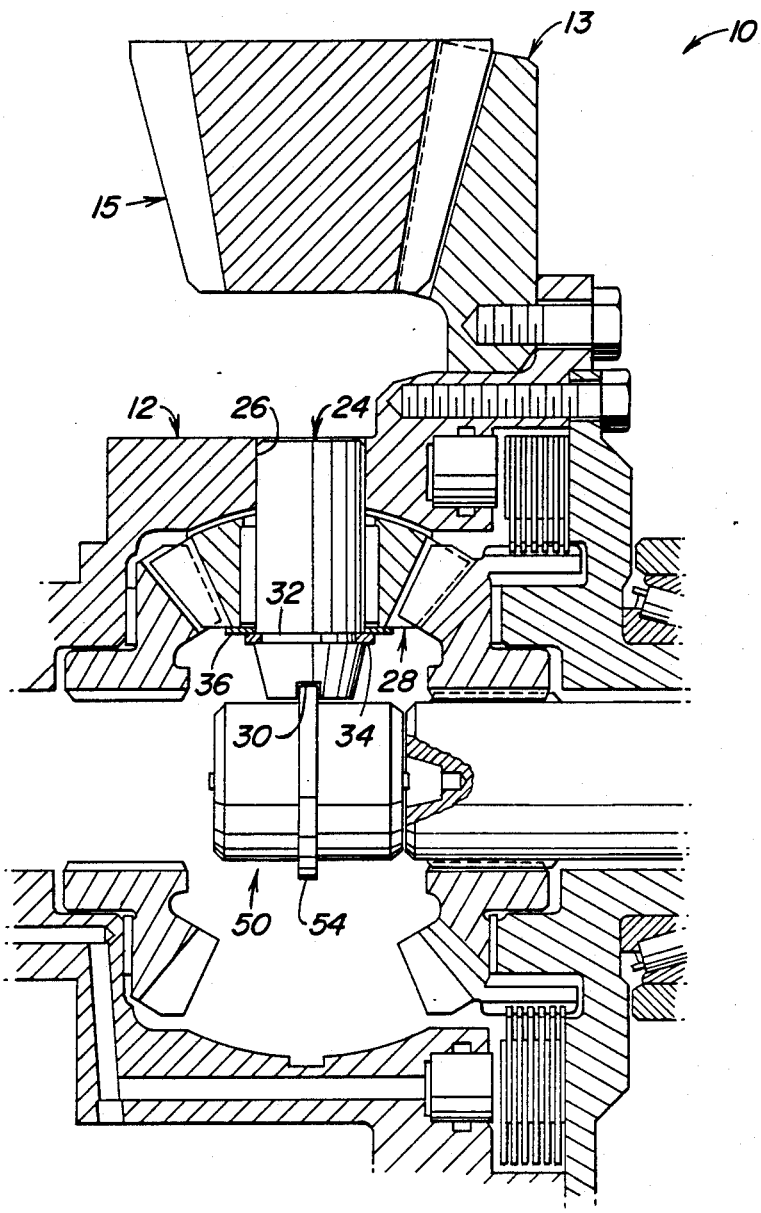
FIG. 2 is a partial sectional view of an alternate embodiment of the present invention.

An alternative embodiment is shown in FIG. 2, where the disc 40 of FIG. 1 is replaced by a cylindrical member 50 having a cylindrical shoulder 54 projecting radially from the member 50 into the groove 30. The shoulder 54 could be formed integrally with the member 50, or the shoulder 54 could be formed by a snap ring (not shown) received in an annular circumferential groove (not shown) in the member 50.

Figure 3:
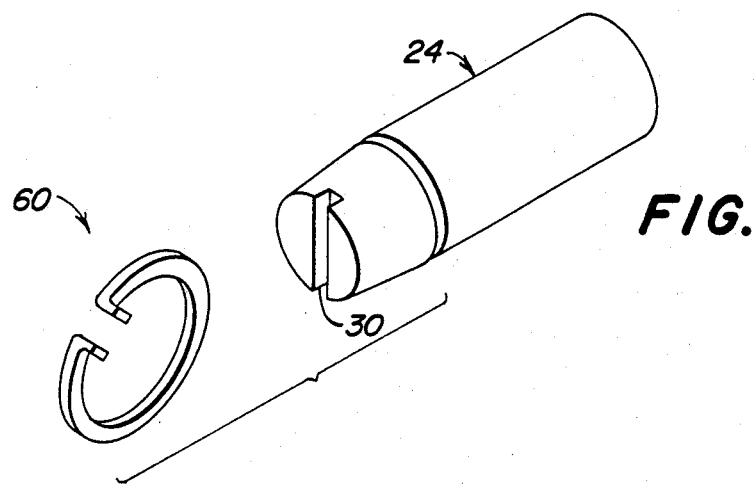
FIGS. 3-5 are simplified exploded perspective view of pinion shafts and central members according to additional embodiments of the present invention.

Another alternative embodiment is shown in FIG. 3 wherein the disc 40 of FIG. 1 is replaced by a generally annular snap ring 60 which is received by the groove 30 of the pinion shaft 24. Tangs on the snap ring 60 prevent rotation of ring 60 to a position where the gap in ring 60 would line up with the inner end of one of the pinion shafts 30.

Figure 4:
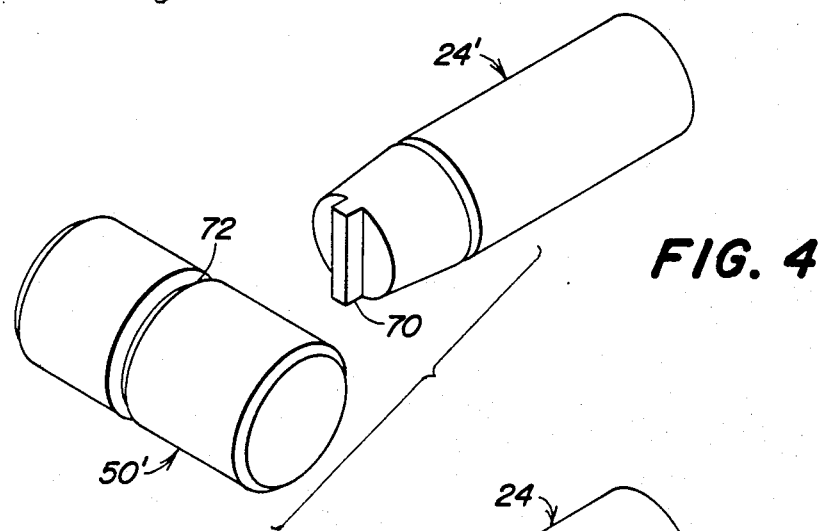

Another embodiment is shown in FIG. 4, wherein the bevel pinion shaft 24' has a tab 70 which is received in a groove 72 in a cylindrical member 50'.

Figure 5:
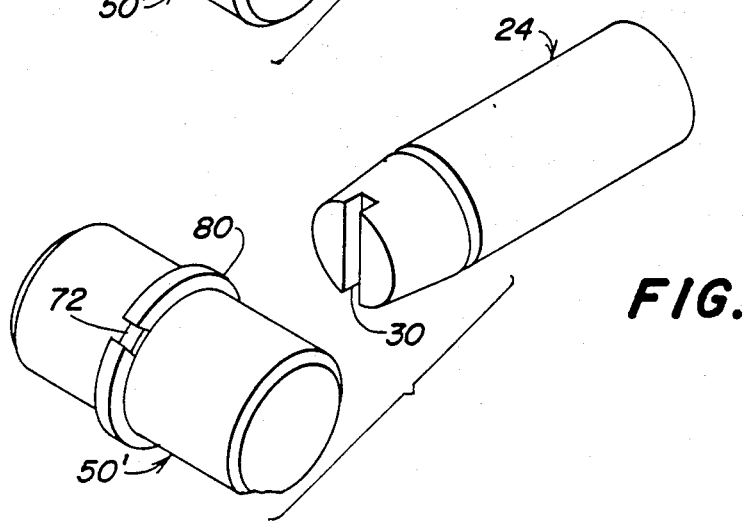

Another embodiment is shown in FIG. 5 wherein a snap ring 80 is received in the groove 72 of cylindrical member 50' and the groove 30 in the pinion shaft 24 receives the snap ring.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A transmission differential comprising:
   a case mounted for rotation about a main axis;
   first and second output shafts received by the case and rotatable about the main axis;
   first and second bevel sun gears, each being non-rotatably mounted on a corresponding one of the output shafts;
   a plurality of planet pin members, each pin member received by an aperture in the case and extending perpendicular to the main axis;
   a plurality of bevel planet gears, each rotatably mounted on a corresponding one of the pin members in meshing engagement with the first and second bevel sun gears; and
   a central member positioned between the output shafts, the central member and each planet pin member having portions engageable with each other to prevent rotation of each planet pin member.

2. The transmission differential of claim 1, wherein:
   each planet pin member has a projection projecting inwardly from a radially inner end thereof; and the central member has a recess therein which receives the projections of each planet pin member, each projection being engageable with a side wall of the recess to prevent rotation of the planet pin member.

3. A transmission differential comprising:

a case mounted for rotation about a main axis;

first and second output shafts received by the case and rotatable about the main axis;

first and second bevel sun gears, each being non-rotatably mounted on a corresponding one of the output shafts;

a plurality of planet pin members, each pin member received by an aperture in the case and extending perpendicular to the main axis;

a plurality of bevel planet gears, each rotatably mounted on a corresponding one of the pin members in meshing engagement with the first and second bevel sun gears; and a central member positioned between the output shafts, the central member and each planet pin member having portions engageable with each other to prevent rotation of each planet pin member, each planet pin member having a recess in a radially inner end thereof, each recess receiving a portion of the central member, said portion being engageable with side walls of said recess to prevent rotation of the planet pin member.

4. A transmission differential comprising:

a case mounted for rotation about a main axis;

first and second output shafts received by the case and rotatable about the main axis;

first and second bevel sun gears, each being non-rotatably mounted on a corresponding one of the output shafts;

a plurality of planet gear pins, each received by an aperture in the case and extending in a direction perpendicular to the main axis, each pin having a groove in a radially inner end thereof;

a plurality of bevel planet gears, each rotatably mounted on a corresponding pin in meshing engagement with the first and second bevel sun gears;

a cylindrical member positioned between the output shafts, the cylindrical member engaging the inner ends of the pins to prevent radially inward movement thereof and the cylindrical member being received by the grooves to prevent rotation of each pin about its axis.

5. The differential of claim 4, wherein:

each pin carries an abutment which is engageable with one of the planet gears to limit radially outward movement of the pin.

6. The differential of claim 4, wherein:

each pin has a peripheral annular groove therein;

an annular ring is mounted on the pin adjacent the annular groove; and a snap ring is received in the annular groove, the annular ring engaging the snap ring and one of the planet gears to limit radially outward movement of the pin.

7. The differential of claim 4, wherein the cylindrical member comprises:

a cylindrical hub extending along the main axis and having opposite ends engaging the first and second output shafts; and a cylindrical projection projecting radially outwardly from a central portion of the hub, the projection being received by the grooves in the pins.

* * * * *